US012679656B1

(12) United States Patent
Janjua et al.

(10) Patent No.: US 12,679,656 B1
(45) Date of Patent: Jul. 14, 2026

(54) METHOD OF STORING HYDROGEN IN AN UNDERGROUND GEOLOGICAL FORMATION

(71) Applicant: King Fahd University of Petroleum and Minerals, Dhahran (SA)

(72) Inventors: Aneeq Nasir Janjua, Al Khobar (SA); Shirish Patil, Dhahran (SA); Mohamed Mahmoud, Dhahran (SA); Muhammad Shahzad Kamal, Dhahran (SA); Arshad Raza, Dhahran (SA); Mobeen Murtaza, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/382,033

(22) Filed: Nov. 6, 2025

(30) Foreign Application Priority Data

Nov. 2, 2025 (SA) ................................. 1020258127

(51) Int. Cl.
*B65G 5/00* (2006.01)
*F17C 11/00* (2006.01)

(52) U.S. Cl.
CPC ............ *B65G 5/005* (2013.01); *F17C 11/005* (2013.01)

(58) Field of Classification Search
CPC ........... B65G 5/00; B65G 5/005; Y02E 60/32; F17C 1/005; F17C 1/007; F17C 2201/012; F17C 2270/0155; F17C 2270/0152; F17C 11/005; E21B 41/0057; E21B 41/0064
See application file for complete search history.

(56) References Cited

U.S. PATENT DOCUMENTS

| | | | |
|---|---|---|---|
| 2005/0109504 A1* | 5/2005 | Heard | E21B 43/006 166/305.1 |
| 2019/0291153 A1* | 9/2019 | Vandenbruwane | E02D 5/66 |
| 2022/0251935 A1* | 8/2022 | Vinegar | E21B 43/164 |
| 2024/0240539 A1* | 7/2024 | Okuno | C09K 8/74 |
| 2024/0410255 A1* | 12/2024 | Haq | E21B 41/0057 |
| 2025/0033886 A1 | 1/2025 | Al-Qasim et al. | |
| 2025/0263237 A1* | 8/2025 | Jian | C01B 3/02 |

FOREIGN PATENT DOCUMENTS

| | | | | |
|---|---|---|---|---|
| KR | 10-2025-0066786 A | 5/2025 | | |
| WO | WO-2007021055 A1 * | 2/2007 | | F17C 11/005 |

OTHER PUBLICATIONS

Hangkyo Jin, et al., "Hydrogen adsorption characteristics of activated carbon", Catalysis Today, vol. 120, Issues 3-4, Nov. 7, 2006, pp. 399-406.

Alankaa Al-Harbi, et al., "Hydrogen Underground Storage in Silica-Clay Shales: Experimental and Density Functional Theory Investigation", ACS Omega, vol. 8, Issue 48, Nov. 23, 2023, pp. 45906-45913.

* cited by examiner

*Primary Examiner* — Kyle Armstrong
(74) *Attorney, Agent, or Firm* — Oblon, McClelland, Maier & Neustadt, L.L.P.

(57) ABSTRACT

A method of storing hydrogen includes treating an underground geological formation containing subterranean rocks and absorbing the hydrogen gas into the treated underground geological formation.

19 Claims, 4 Drawing Sheets

METHOD OF STORING HYDROGEN IN AN UNDERGROUND GEOLOGICAL FORMATION

CROSS-REFERENCE TO RELATED APPLICATION

The present disclosure claims the benefit of Saudi Patent Application No. 1020258127, filed Nov. 2, 2025 with the Saudi Authority for Intellectual Property Office, which is incorporated herein by reference in its entirety.

STATEMENT OF ACKNOWLEDGEMENT

Support provided by the King Fahd University of Petroleum and Minerals (KFUPM), Saudi Arabia is gratefully acknowledged.

BACKGROUND

Technical Field

The present disclosure relates to the field of underground energy storage. More particularly, it relates to a method for enhancing the storage capacity of hydrogen gas in subterranean geological formations by pre-treating the formations with liquid activated carbon (LAC).

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, is neither expressly nor impliedly admitted as prior art against the present invention.

Over the past few decades, global energy demand has increased substantially, driven by rapid population growth and industrial development. In order to mitigate the adverse effects of climate change and reduce dependence on fossil fuels, significant efforts have been directed toward the development of clean and sustainable energy technologies. Among the various alternatives, hydrogen ($H_2$) has emerged as a promising energy carrier owing to its high energy density, environmental compatibility, and wide applicability in power generation, transportation, and industrial sectors.

However, one of the principal challenges in establishing a viable hydrogen economy is the issue of large-scale hydrogen storage. Hydrogen is highly compressible and volatile, and its storage and transportation present significant technical and economic hurdles. Conventional storage methods, such as high-pressure tanks, cryogenic storage, and metal hydrides, despite being widely studied, suffer from drawbacks including high energy requirements, low storage efficiency, safety concerns, and prohibitive costs. Accordingly, alternative storage approaches are being investigated.

Hydrogen geo-storage, where compressed hydrogen is injected into suitable geological formations for later retrieval, has gained increasing attention as a viable large-scale solution. Examples of such geological formations include depleted oil and gas reservoirs, saline aquifers, and porous rock structures. The feasibility of such storage depends on a clear understanding of the geo-mechanical and geo-chemical interactions between hydrogen, reservoir fluids, and host rock formations. In recent years, studies have highlighted the importance of adsorption phenomena in governing hydrogen retention and release under reservoir conditions.

Among the adsorption-based approaches, physisorption on activated carbon has been proposed as a promising pathway to enhance hydrogen storage capacity. Activated carbon, when introduced into porous geological formations, can significantly improve hydrogen uptake through surface adsorption. Nevertheless, existing studies on hydrogen adsorption are limited in scope, often focusing on controlled laboratory conditions rather than realistic geological environments.

Accordingly, an object of the present disclosure is to enhance the hydrogen adsorption potential of sandstone, limestone, and shale formations through liquid activated carbon (LAC) treatment. The present disclosure aims to overcome limitations of prior methods, enabling improved efficiency, reliability, and scalability of hydrogen geo-storage technologies

SUMMARY

In an exemplary embodiment, a method of storing hydrogen in an underground geological formation is described. The method includes injecting a liquid activated carbon into the underground geological formation and absorbing the liquid activated carbon in the underground geological formation to form a treated underground geological formation. Such underground geological formation is at least one subterranean rock selected from the group consisting of sandstone, limestone, and Eagle Ford shale. The method further includes injecting a gaseous mixture comprising mainly hydrogen into the treated underground geological formation, thereby absorbing the hydrogen gas into the treated underground geological formation. The liquid activated carbon and the gaseous mixture are injected through different boreholes into the same underground geological formation.

In some embodiments, the subterranean rock is sandstone including quartz at a weight percentage of 90 to 98 wt. %, dolomite at a weight percentage of 0.5 to 1.0 wt. %, and microcline at a weight percentage of 3 to 5 wt. %, based on the total weight of the subterranean rock.

In some embodiments, the subterranean rock is limestone including calcite.

In some embodiments, the subterranean rock is Eagle Ford shale including quartz at a weight percentage of 11 to 15 wt. %, and calcite at a weight percentage of 80 to 90 wt. %, based on the total weight of the subterranean rock.

In some embodiments, the subterranean rock includes quartz. The quartz contains elemental silicon at a weight percentage of 85 to 90 wt. %, elemental sulfur at a weight percentage of 0.01 to 0.05 wt. %, elemental potassium at a weight percentage of 1 to 5 wt. %, elemental calcium at a weight percentage of 1 to 5 wt. %, elemental titanium at a weight percentage of 0.1 to 1 wt. %, elemental chromium at a weight percentage of 0.1 to 1 wt. %, elemental manganese at a weight percentage of 0.1 to 1 wt. %, elemental iron at a weight percentage of 5 to 10 wt. %, elemental zinc at a weight percentage of 0.01 to 0.05 wt. %, and elemental zirconium at a weight percentage of 0.1 to 0.5 wt. %, based on the total weight of the quartz.

In some embodiments, the subterranean rock includes calcite. The calcite includes elemental silicon at a weight percentage of 0.1 to 0.5 wt. %, elemental sulfur at a weight percentage of 0.1 to 0.5 wt. %, elemental calcium at a weight percentage of 95 to 99.5 wt. %, elemental manganese at a weight percentage of 0.01 to 0.05 wt. %, elemental iron at a weight percentage of 0.1 to 0.5 wt. %, elemental zinc at a weight percentage of 0.01 to 0.05 wt. %, and elemental zirconium at a weight percentage of 0.01 to 0.05 wt. %, based on the total weight of the calcite.

In some embodiments, the subterranean rock is eagle ford shale including elemental silicon at a weight percentage of 15 to 25 wt. %, elemental sulfur at a weight percentage of 1 to 5 wt. %, elemental potassium at a weight percentage of 0.1 to 0.5 wt. %, elemental calcium at a weight percentage of 70 to 80 wt. %, elemental manganese at a weight percentage of 0.1 to 1 wt. %, elemental iron at a weight percentage of 0.5 to 1 wt. %, elemental aluminum at a weight percentage of 1 to 5 wt. %, and elemental phosphorus at a weight percentage of 0.1 to 0.5 wt. %, based on the total weight of the eagle ford shale.

In some embodiments, the subterranean rock comprises a plurality of particles having a particle size of 1 to 100 microns ($\mu$m), and the liquid activated carbon is absorbed at a volume percentage of 100 to 200 mL per 10 to 20 grams of the subterranean rock.

In some embodiments, the liquid activated carbon is absorbed in the underground geological formation at an ambient temperature for at least 24 hours.

In some embodiments, the gaseous mixture includes hydrogen at a volume percentage of 95 to 100 vol. %.

In some embodiments, hydrogen is injected at a pressure of 0.5 to 10 MPa under an ambient temperature.

In some embodiments, 0.4 to 0.8 mmol of $H_2$ per 1 gram of the subterranean rock is adsorbed by the treated underground geological formation.

In some embodiments, 8 to 50% more $H_2$ by mole per 1 gram of the subterranean rock is absorbed by the treated underground geological formation than an untreated underground geological formation.

In some embodiments, hydrogen is injected at a pressure of 6 to 7 MPa where the subterranean rock comprises quartz, and 0.4 to 0.5 mmol of $H_2$ per 1 gram of the quartz is absorbed by the treated underground geological formation.

In some embodiments, 8 to 10% more $H_2$ by mole per 1 gram of the subterranean rock is absorbed by the treated underground geological formation than an untreated underground geological formation.

In some embodiments, hydrogen is injected at a pressure of 6 to 7 MPa where the subterranean rock comprises calcite, and 0.7 to 0.8 mmol of $H_2$ per 1 gram of the calcite is absorbed by the treated underground geological formation.

In some embodiments, 20 to 30% more $H_2$ by mole per 1 gram of the subterranean rock is absorbed by the treated underground geological formation than an untreated underground geological formation.

In some embodiments, the hydrogen is injected at a pressure of 6 to 7 MPa where the subterranean rock is eagle ford shale, and 0.6 to 0.7 mmol of $H_2$ per 1 gram of the eagle ford shale is absorbed by the treated underground geological formation.

In some embodiments, 40 to 50% more $H_2$ by mole per 1 gram of the subterranean rock is absorbed by the treated underground geological formation than an untreated underground geological formation.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
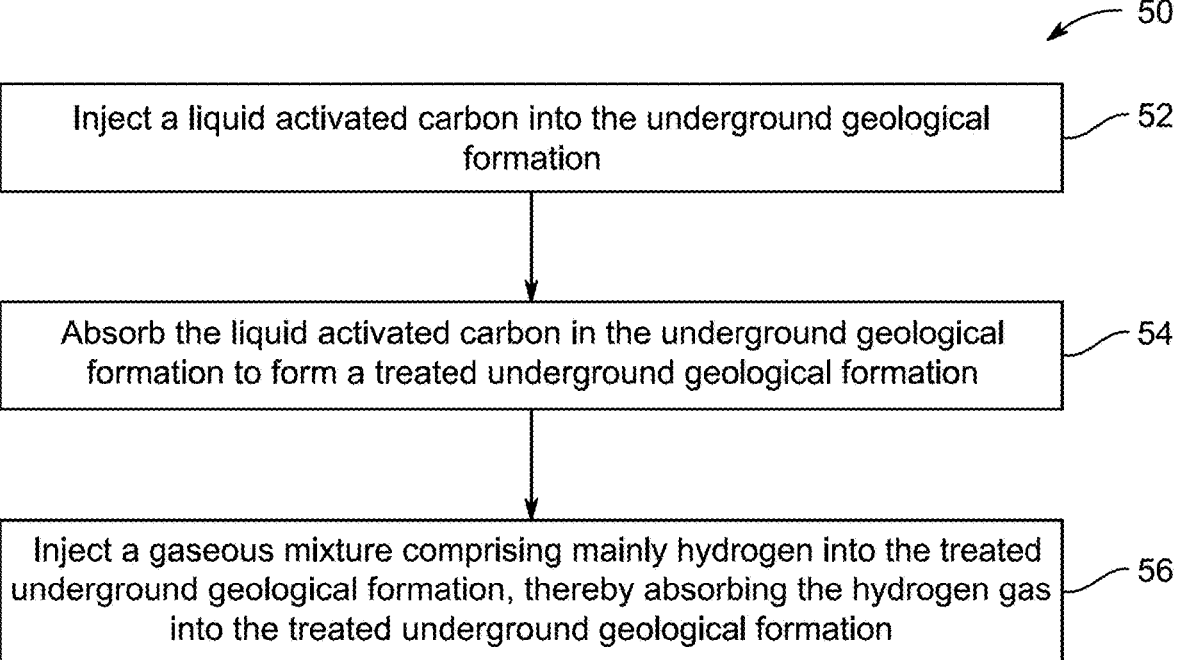
FIG. 1 is a flowchart showing a method of storing hydrogen in an underground geological formation, according to certain embodiments.

Embodiments of the present invention may now be described more fully hereinafter with reference to the accompanying drawings, wherever applicable, in that some, but not all, embodiments of the disclosure are shown.

When describing the present disclosure, the terms used are to be construed in accordance with the following definitions, unless context dictates otherwise.

In the drawings, reference numerals designate identical or corresponding parts throughout the several views. Further, as used herein, the words "a", "an", and the like generally carry a meaning of "one or more", unless stated otherwise.

Furthermore, the terms "approximately", "approximate", "about" and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C.

As used herein, the term "absorption" refers to the penetration or uptake of the liquid activated carbon into the pores, grain boundaries, and interstitial voids of the subterranean rock.

As used herein, the term "adsorption" refers to the surface binding or retention of hydrogen molecules onto the internal surfaces of the treated rock after liquid-activated carbon (LAC) treatment.

As used herein, the term "ambient temperature" refers to the temperature in the subsurface environment at the depth of injection, typically ranging from 20° C. to 60° C.

As used herein, the term "liquid activated carbon (LAC)" refers to a colloidal suspension of activated carbon particles dispersed in a liquid medium, typically water, having a surface area in the range of 500-1500 $m^2/g$ and an average particle size of 10-500 nm.

As used herein, the term "treated underground geological formation" refers to a formation into which liquid activated carbon has been injected and absorbed, resulting in modified porosity, density, and surface properties compared to an untreated formation.

As used herein, the term "subterranean rock" refers to sedimentary or other geological rock formations located at depths ranging from 50 meters to several kilometers below the ground surface.

Aspects of the present disclosure are directed to a method for storing hydrogen ($H_2$) in underground geological formations, including sandstone, limestone, and Eagle Ford shale, and to an enhanced hydrogen adsorption capacity by treating these formations with liquid activated carbon (LAC). Underground hydrogen storage is an essential component of a sustainable energy economy, and efficient storage depends on both the mineralogical properties of rock formation and the ability to increase hydrogen uptake. The method of the present disclosure improves hydrogen storage efficiency, containment, and adsorption capacity under natural reservoir conditions.

FIG. 1 illustrates a flow chart of a method 50. The method 50 is for storing hydrogen in an underground geological formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a liquid activated carbon (LAC) into the underground geological formation. Examples of underground geological formations suitable for hydrogen storage include sandstone, limestone, and shale formations. Sandstone formations are characterized by high porosity and permeability, are primarily composed of quartz, and are well-suited for storing gases under moderate pressure. Limestone formations consist mainly of calcite, exhibit moderate porosity, and may contain natural fractures that enhance gas storage and adsorption potential. Shale formations, such as the Eagle Ford Shale, are fine-grained with low permeability but high surface area, making them particularly effective for adsorption-based hydrogen storage, especially after chemical treatment. Other types of formations that can be considered for large-scale gas storage include salt caverns, depleted oil or gas reservoirs, and basalt formations.

In some embodiments, the underground geological formation is at least one subterranean rock selected from sandstone, limestone, and Eagle Ford shale. In some embodiments, the subterranean rock is sandstone including 90-98 wt. % quartz, 0.5-1.0 wt. % dolomite, and 3-5 wt. % microcline, based on the total weight of the subterranean rock. The quartz may include 85-90 wt. % silicon, 0.01-0.05 wt. % sulfur, 1-5 wt. % potassium, 1-5 wt. % calcium, 0.1-1 wt. % titanium, 0.1-1 wt. % chromium, 0.1-1 wt. % manganese, 5-10 wt. % iron, 0.01-0.05 wt. % zinc, and 0.1-0.5 wt. % zirconium, based on the total weight of the quartz. In a preferred embodiment, the subterranean rock is sandstone including 95.3 wt. % quartz, 0.8 wt. % dolomite, and 3.9 wt. % microcline, based on the total weight of the subterranean rock. In a preferred embodiment, the quartz includes 88.13 wt. % of silica, 0.01 wt. % sulfur, 4.14 wt. % potassium, 1.01 wt. % calcium, 0.81 wt. % titanium, 0.14 wt. % chromium, 0.08 wt. % manganese, 5.55 wt. % iron, 0.02 wt. % zinc, and 0.011 wt. % zirconium, based on the total weight of the quartz.

In some embodiments, the subterranean rock is limestone including calcite. In some embodiments, the calcite may include 0.1-0.5 wt. % silicon, 0.1-0.5 wt. % sulfur, 95-99.5 wt. % calcium, 0.01-0.05 wt. % manganese, 0.1-0.5 wt. % iron, 0.01-0.05 wt. % zinc, and 0.01-0.05 wt. % zirconium, based on the total weight of calcite. In a preferred embodiment, the limestone includes 100% calcite. In a preferred embodiment, the calcite includes 0.1 wt. % silicon, 0.1 wt. % sulfur, 99.33 wt. % calcium, 0.02 wt. % manganese, 0.42 wt. % iron, 0.01 wt. % zinc, and 0.01 wt. % zirconium, based on the total weight of calcite.

In some embodiments, the subterranean rock is Eagle Ford shale including 11-15 wt. % quartz and 80-90 wt. % calcite based on the total weight of the subterranean rock. In some embodiments, the Eagle Ford shale may include 15-25 wt. % silicon, 1-5 wt. % sulfur, 0.1-0.5 wt. % potassium, 70-80 wt. % calcium, 0.1-1 wt. % manganese, 0.5-1 wt. % iron, 1-5 wt. % aluminum, and 0.1-0.5 wt. % phosphorus, based on the total weight of Eagle Ford shale. In a preferred embodiment, the subterranean rock is Eagle Ford shale including 11.4 wt. % quartz and 88.6 wt. % calcite based on the total weight of the subterranean rock. In a preferred embodiment, the Eagle Ford shale includes 17.5 wt. % silicon, 1.13 wt. % sulfur, 0.19 wt. % potassium, 77.65 wt. % calcium, 0.5 wt. % manganese, 0.55 wt. % iron, 2.03 wt. % aluminum, and 0.1 wt. % phosphorus, based on the total weight of Eagle Ford shale.

In some embodiments, the subterranean rock comprises particles with a particle size of 1 to 100 microns ($\mu$m). In one embodiment, the subterranean rock comprises particles having a particle size of 1 to 50 $\mu$m. In another embodiment, the subterranean rock comprises particles having a particle size of 10 to 80 $\mu$m. In yet another embodiment, the subterranean rock comprises particles having a particle size of 20 to 60 $\mu$m. In a further embodiment, the subterranean rock comprises particles having an average particle size of about 30 $\mu$m.

In one embodiment, the underground geological formation is treated with LAC to enhance hydrogen adsorption. The LAC may be injected into the formation in a volumetric ratio ranging from 5:1 to 20:1, preferably 7:1 to 17:1, preferably 10:1 to 15:1, preferably 12:1 to 15:1, preferably 15:1 relative to the weight of the rock. The injection may be carried out at ambient temperature, typically in the range of 293-310 K, although slightly elevated temperatures may also be employed to improve absorption.

At step 54, the method 50 includes absorbing the liquid activated carbon into the underground geological formation to form a treated underground geological formation. The liquid activated carbon is absorbed at a ratio of about 100 to 200 mL per 10 to 20 grams of the subterranean rock. In some embodiments, the absorption ratio is 120 to 180 mL per 15 to 20 grams of subterranean rock. In some embodiments, the absorption ratio is 130 to 170 mL per 10 to 15 grams of subterranean rock. The absorption may be carried out at an ambient temperature, from about 20 to about 30° C., and in another embodiment at an ambient temperature of about 25±2° C. In some embodiments, the absorption is maintained for a duration of at least 24 hours. In some embodiments, the absorption is maintained for 24 to 48 hours. In some embodiments, the absorption is maintained up to 72 hours to ensure complete interaction of the liquid activated carbon with the subterranean rock. The absorption may be conducted under static conditions or under dynamic conditions such as shaking, stirring, or agitation, and in some embodiments under periodic agitation followed by resting intervals. The treated underground geological formation includes a substantially homogeneous distribution of the liquid activated carbon within the plurality of particles of the subterranean rock, while retaining a porosity suitable for hydrogen storage.

At step 56, the method 50 includes injecting a gaseous mixture comprising mainly hydrogen into the treated underground geological formation, thereby absorbing the hydrogen gas into the treated underground geological formation. The liquid activated carbon and the gaseous mixture are injected through different boreholes into the same underground geological formation. In some embodiments, the gaseous mixture includes hydrogen at a volume percentage of 95 to 100 vol. %, preferably 98 to 100 vol. %, and more preferably about 99 to 100 vol. %. In some embodiments, the hydrogen is injected at a pressure of 0.5 to 10 MPa under ambient temperature, and in particular embodiments at 6 to 7 MPa, or more preferably 6.05 to 6.1 MPa.

The treated underground geological formation absorbs approximately 0.4 to 0.8 mmol of $H_2$ per gram of subterranean rock, corresponding to an increase of about 8 to 50% in hydrogen absorption by mole per gram of subterranean rock relative to an untreated formation. In some embodiments, the treated underground geological formation absorbs 0.5 to 0.7 mmol of $H_2$ per gram of subterranean rock, corresponding to an increase of 20 to 50%.

In some embodiments, the subterranean rock includes quartz, and hydrogen is injected at 6 to 7 MPa, where 0.4 to 0.5 mmol of $H_2$ per gram of quartz is absorbed, corresponding to 8 to 10% more hydrogen than in the untreated formation. In some embodiments, the subterranean rock including quartz, and hydrogen is injected at 6 to 7 MPa, where 0.42 to 0.45 mmol of $H_2$ per gram of quartz is absorbed, corresponding to 8.2 to 9.5% more hydrogen than in the untreated formation.

In some embodiments, the subterranean rock includes calcite, and hydrogen absorption is 0.7 to 0.8 mmol per gram, corresponding to 20 to 30% more hydrogen than that of the untreated formation. In some embodiments, the subterranean rock includes calcite, and hydrogen absorption is 0.72 to 0.76 mmol per gram, corresponding to 22 to 28% more hydrogen than that of the untreated formation.

In some embodiments, the subterranean rock is Eagle Ford shale, and hydrogen absorption is 0.6 to 0.7 mmol per gram, corresponding to 40 to 50% more hydrogen than that of the untreated formation. In some embodiments, the subterranean rock is Eagle Ford shale, and hydrogen absorption is 0.62 to 0.66 mmol per gram, corresponding to 42 to 48% more hydrogen than that of the untreated formation.

The method of the present disclosure is versatile and applicable to a wide range of underground formations. It provides a safe and effective approach to large-scale hydrogen storage, significantly enhancing adsorption capacity, containment, and efficiency. The present disclosure also allows optimization of liquid activated carbon composition and treatment conditions to maximize hydrogen uptake in specific geological formations, making it suitable for both laboratory and industrial-scale applications.

The following examples are provided solely for illustration and are not to be construed as limitations of the present disclosure, as many variations thereof are possible without departing from the spirit and scope of the present disclosure.

EXAMPLES

The following examples demonstrate a method of storing hydrogen in an underground geological formation as described herein. The examples are provided solely for illustration and are not to be construed as limitations of the present disclosure, as many variations thereof are possible without departing from the spirit and scope of the present disclosure.

Example 1: Materials and Methods

Samples of sandstone, limestone, and Eagle Ford shale are collected and crushed into powdered form. The powdered samples are then sieved through a <100 μm sieve plate to keep the uniform size for all the samples. The powdered samples of rock are used as they provide more surface area than the rigid rock sample, which ultimately increases the adsorption. $H_2$ gas of 99.99% purity obtained from Abdullah Hashim Group (AHG) is used, while liquid activated carbon (LAC) of 0.05 wt. % concentration is used. For the adsorption measurements, low-pressure adsorption equipment (GADIS-LP by Vinci Technologies) is utilized. In the first stage, experiments are performed with a 10 g powdered sample of non-treated sandstone, limestone, and shale, and their adsorption is measured. In the second stage, the same weight powdered sample of sandstone, limestone, and Eagle Ford shale is treated with 0.05 wt. % LAC and their adsorption measurements are taken.

Figure 2:
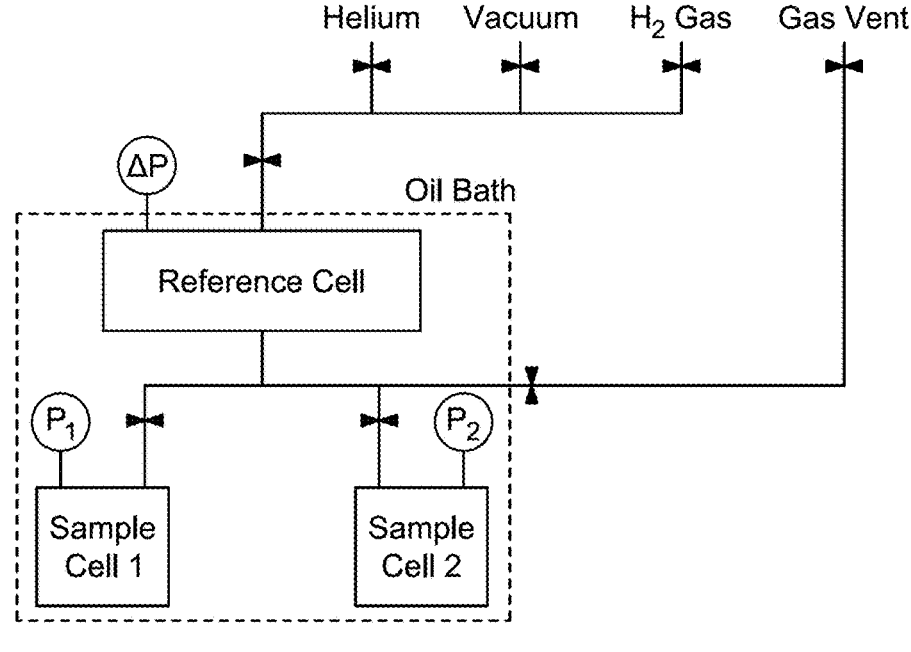
FIG. 2 shows a schematic diagram for the measurement of $H_2$ adsorption, according to certain embodiments.

A weighed sample of 10 g of powdered rock is placed in a sample cell. The system is vacuumed thoroughly to remove any air and leak tested. A series of helium expansions from the previously calibrated volume of the reference cell into the sample cell allows the void volume to be calculated. With the sample valve shut, the initial sample cell pressure is recorded. The sample valve is opened to pressurize the sample cell with $H_2$ and then closed after 5 seconds. Within the sample cell, the pressure decreases due to $H_2$ adsorption onto the rock sample, and this pressure is recorded until equilibrium is reached. Equilibrium is defined as a steady pressure reading for 120 minutes. The reference pressure is further increased, and the cycle is repeated over 6 pressure points to the required maximum pressure to characterize the isotherm (FIG. 2).

Figure 3:
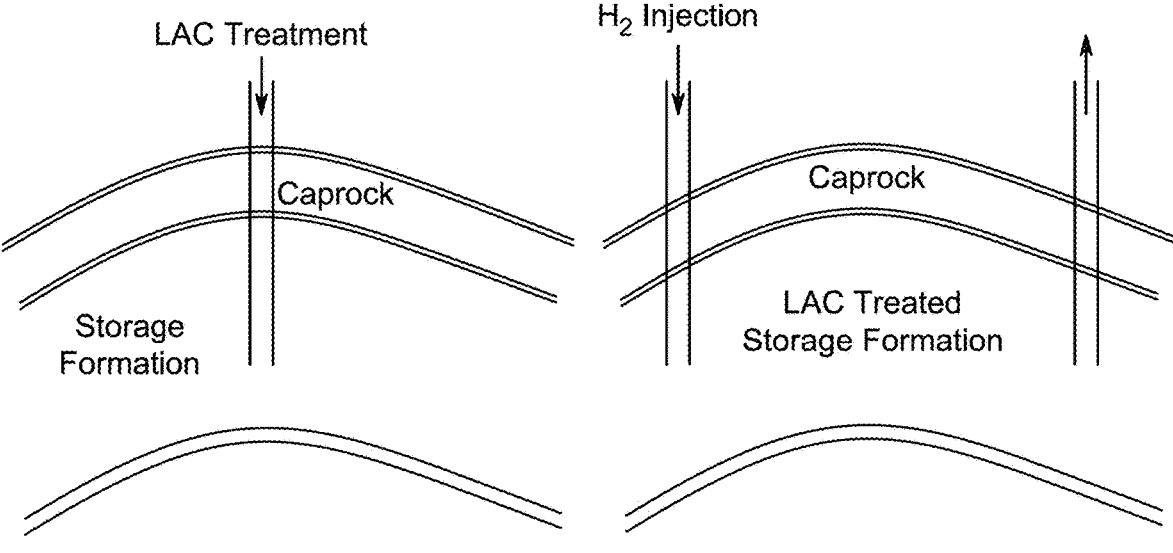
FIG. 3 is a schematic diagram of the production strategy to show the treatment with liquid activated carbon (LAC) and $H_2$ injection, where the liquid activated carbon and the gaseous mixture containing $H_2$ gas is injected through different boreholes into the same underground geological formation, according to certain embodiments.

For the second stage adsorption measurements, the powdered samples are treated with LAC in the ratio of 1:15, where 10 g of powder is subjected to treatment with 150 ml of LAC. The samples are kept in a shaking water bath for 24 hrs at ambient temperature (298 K) for proper mixing of LAC with the rock sample. After that, the samples are centrifuged at 2000 rpm for 5 min. Following centrifugation, the samples are kept static for another 24 hours for equilibrium. The liquid from the top is separated, while the rock powder treated with carbon is taken and dried in an oven for 24 hours at 343 K. For calibration purposes, helium gas is used, and the void volumes at various pressures are determined. $H_2$ gas is then injected, and adsorption measurements are taken for the treated and non-treated samples of sandstone, limestone, and shale. The measurements are taken at various pressures (0.6 to 6 MPa) and constant temperature (298 K). For each pressure value in the experiment, an equilibrium time of 120 minutes is provided to allow the gas to get absorbed on the surface of the sample. The graphs are plotted for non-treated and treated samples (FIG. 3). Calculation of the gas adsorbed is based on the gas equation:

$$PV = nRTz$$

The rock samples of sandstone, limestone, and shale are characterized using X-ray diffraction (XRD) and X-ray fluorescence (XRF) analysis, which provide qualitative and quantitative analysis, respectively. The sandstone sample XRD results showed the presence of 95.3% quartz, 0.8% dolomite, and 3.9% microcline. XRD of the limestone sample showed 100% calcite, whereas the shale indicated the presence of 11.4% quartz and 88.6% calcite. XRF results showed the elemental composition in mass percent of each rock sample. For quartz, the major contribution of Si mineral was found to be 88.13%, for limestone, 99.33% calcite, and for shale, a mix of quartz and calcite was obtained.

TABLE 1

| | XRD analysis of the rock samples | | | |
| | | | | |
| | | XRD Analysis | | |
| Sample | Quartz (%) | Dolomite (%) | Calcite (%) | Microcline (%) |
| Sandstone | 95.3 | 0.8 | — | 3.9 |
| Limestone | — | — | 100 | — |
| Eagle Ford Shale | 11.4 | — | 88.6 | — |

TABLE 2

XRF analysis of the rock samples

| Substrate/ Element | Mass Percent (%) | | | | | | | | | | | |
|---|---|---|---|---|---|---|---|---|---|---|---|---|
| | Si | S | K | Ca | Ti | Cr | Mn | Fe | Zn | Zr | Al | P |
| Quartz | 88.13 | 0.01 | 4.14 | 1.01 | 0.81 | 0.14 | 0.08 | 5.55 | 0.02 | 0.11 | — | — |
| Calcite | 0.10 | 0.10 | 0.00 | 99.33 | 0.00 | 0.00 | 0.02 | 0.42 | 0.01 | 0.01 | — | — |
| EF-Shale | 17.85 | 1.13 | 0.19 | 77.65 | — | — | 0.5 | 0.55 | — | — | 2.03 | 0.1 |

Figure 4:
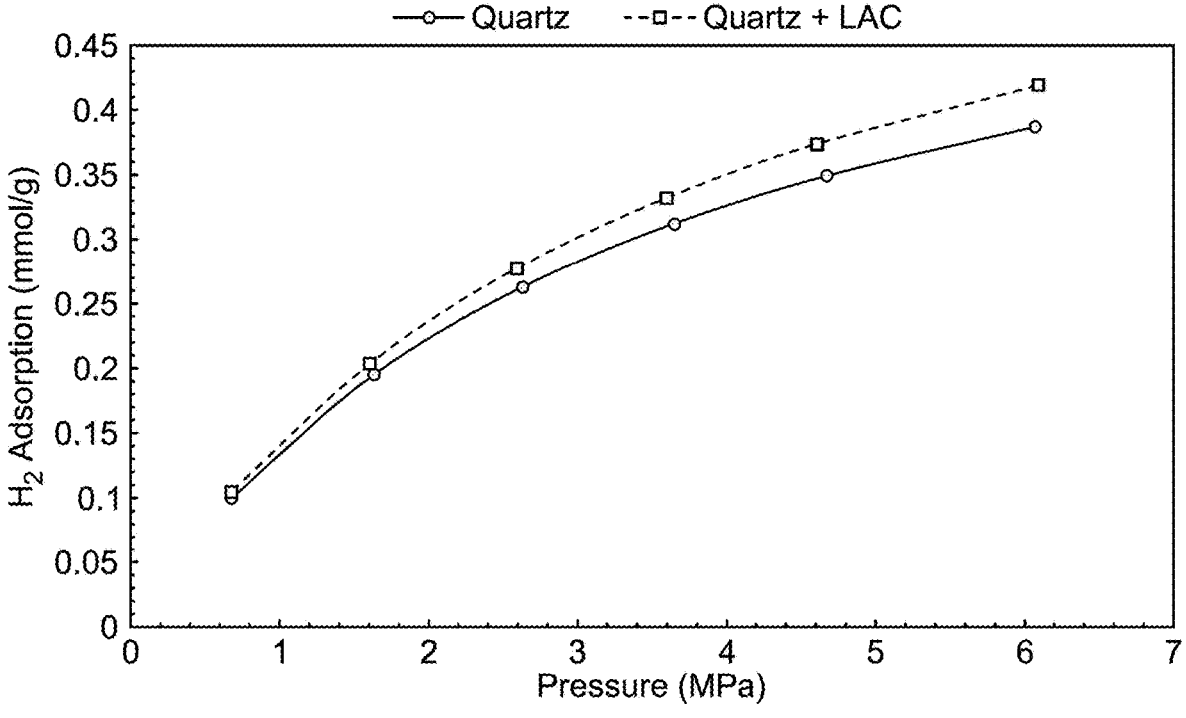
FIG. 4 shows $H_2$ adsorption in molar amount per 1 gram of a subterranean rock versus pressure of an untreated subterranean rock of sandstone and a LAC-treated subterranean rock of sandstone, according to certain embodiments.
Figure 5:
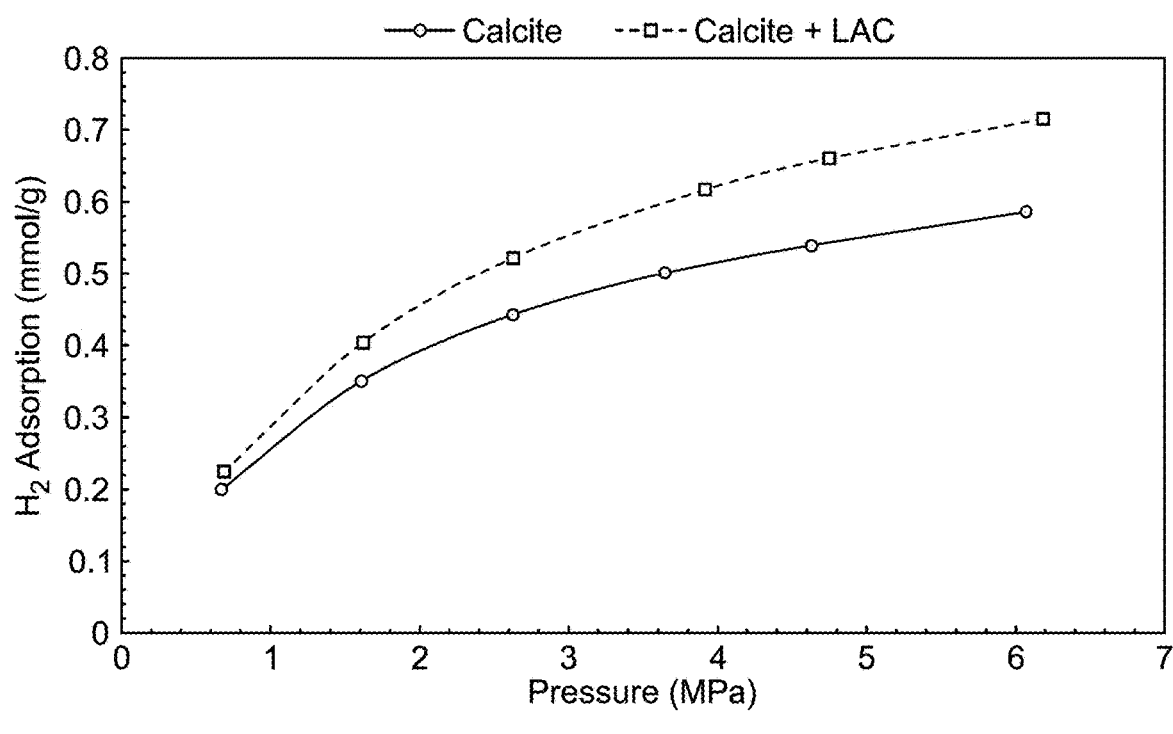
FIG. 5 shows $H_2$ adsorption in molar amount per 1 gram of a subterranean rock versus pressure of an untreated subterranean rock of limestone and a LAC-treated subterranean rock of limestone, according to certain embodiments.
Figure 6:
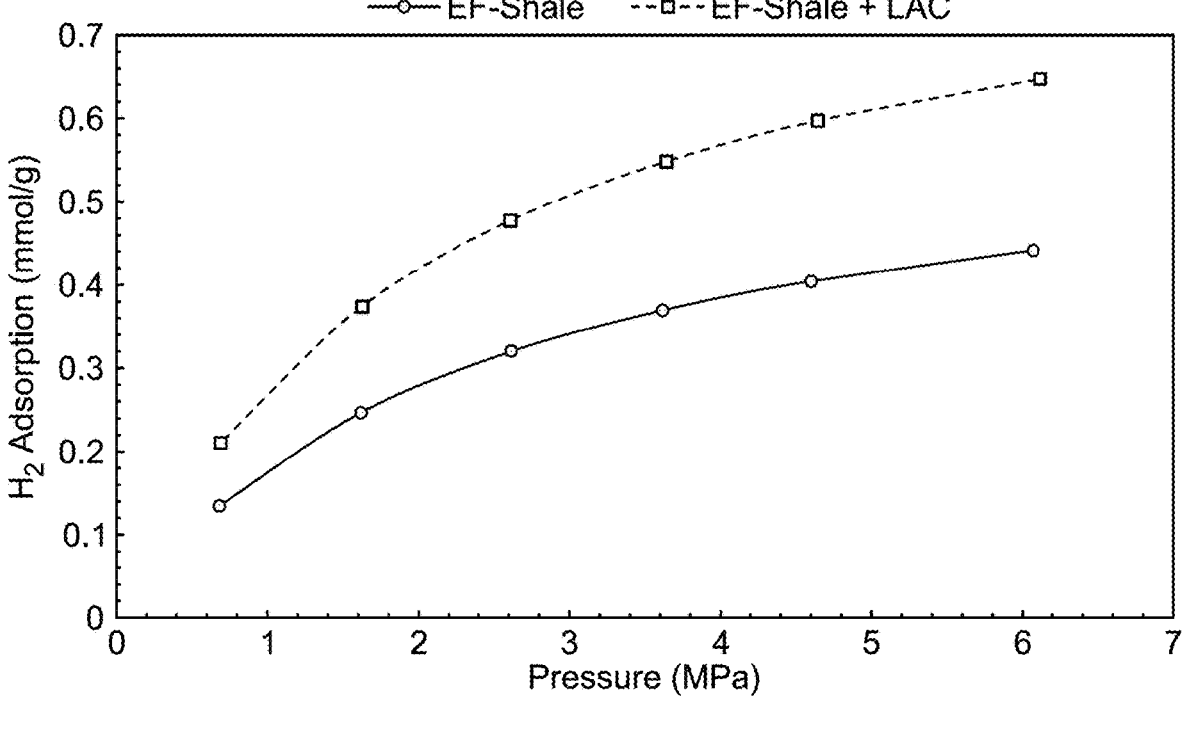
FIG. 6 shows $H_2$ adsorption in molar amount per 1 gram of a subterranean rock versus pressure for an untreated subterranean rock of shale and a LAC-treated subterranean rock of shale, according to certain embodiments.

The influence of pressure on $H_2$ adsorption was studied, and it was observed that the $H_2$ adsorption increased with the increase in pressure of the gas. This phenomenon may be due to the enhanced $H_2$ gas density and high intermolecular interactions of gas at higher pressures. For the case of quartz, calcite, and shale, the maximum $H_2$ adsorption of 0.387, 0.586, and 0.441 mmol/g is obtained at 6.07 MPa, respectively (FIG. 4 to FIG. 6). The maximum adsorption is shown by limestone, as calcite has more affinity towards $H_2$ gas than quartz. It was further observed that in shale, both calcite and quartz minerals are present, and no clay is present. So, the adsorption with shale is obtained between quartz and calcite. However, with sandstone, the lowest $H_2$ adsorption as compared to limestone and shale is obtained, which confirms that $H_2$ has very little adsorption in sandstone reservoirs.

The influence of liquid-activated carbon (LAC) on $H_2$ adsorption is analyzed with sandstone, limestone, and shale formations. The experiments are conducted at various pressures (0.6 to 6 MPa) and constant temperature (298 K). The results indicated an increase in $H_2$ adsorption for all samples when they were treated with LAC. For the cases of quartz, calcite, and shale, the maximum $H_2$ adsorption of 0.419, 0.714, and 0.646 mmol/g is obtained at 6.07 MPa, respectively (FIG. 4 to FIG. 6). These results of $H_2$ adsorption with LAC confirm that treatment of rock formation with LAC can lead to higher $H_2$ adsorption, which is beneficial for large-scale $H_2$ storage applications in various geological media. The percentage increase is calculated by subtracting the initial value from the final value and then dividing the value by the initial value and multiplying by 100. The percentage increase in adsorption is noted to be in the order of shale>limestone>sandstone.

TABLE 3

Percentage increase in H2 adsorption

| Formation rock | $H_2$ Adsorption without treatment (mmol/g) | $H_2$ Adsorption with LAC treatment (mmol/g) | Percentage Increase in $H_2$ Adsorption (mmol/g) |
|---|---|---|---|
| Sandstone | 0.387 | 0.419 | 8.269 |
| Limestone | 0.586 | 0.714 | 21.843 |
| Shale | 0.441 | 0.646 | 46.485 |

LAC was used with various mineralogical compositions, including sandstone, limestone, and shale. The performance of these rocks demonstrated that $H_2$ adsorption increased with the increase in pressure, and a significant increase was observed when these rocks were treated with LAC. This carbon-based material can improve $H_2$ storage efficiency and containment security. The highest percentage increase was observed for shale with 46.485%, then limestone 21.483% and then for sandstone 8.269%. This performance highlights the effectiveness of LAC to improve the geological storage of $H_2$ and containment in the reservoir.

The present disclosure supports Saudi Arabia's Vision 2030 by fostering innovation within the country. The shift toward decarbonization and the usage of clean fuel not only reduces dependency on fossil fuels but also promotes sustainable industrial practices, reinforcing economic diversification and supporting eco-friendly solutions. The present disclosure reflects a strategic step toward sustainable $H_2$ storage in the energy sector, with an emphasis on reducing global warming that resonates with broader national goals of economic growth and technological advancement.

Numerous modifications and variations of the present disclosure are possible in light of the above teachings. It is therefore to be understood that within the scope of the appended claims, the invention may be practiced otherwise than as specifically described herein.

The invention claimed is:

1. A method of storing hydrogen in an underground geological formation, comprising:
    injecting a liquid activated carbon into the underground geological formation,
    wherein the underground geological formation is at least one subterranean rock selected from the group consisting of sandstone, limestone and eagle ford shale;
    absorbing the liquid activated carbon in the underground geological formation to form a treated underground geological formation; and
    injecting a gaseous mixture comprising mainly hydrogen into the treated underground geological formation, thereby absorbing the hydrogen gas into the treated underground geological formation,
    wherein the liquid activated carbon and the gaseous mixture is injected through different boreholes into the same underground geological formation.

2. The method of claim 1, wherein the subterranean rock is sandstone comprising:
    quartz, at a weight percentage of 90 to 98 wt. %;
    dolomite, at a weight percentage of 0.5 to 1.0 wt. %; and
    microcline, at a weight percentage of 3 to 5 wt. %, based on the total weight of the subterranean rock.

3. The method of claim 1, wherein the subterranean rock is limestone comprising calcite.

4. The method of claim 1, wherein the subterranean rock is eagle ford shale comprising:
    quartz, at a weight percentage of 11 to 15 wt. %; and
    calcite, at a weight percentage of 80 to 90 wt. %, based on the total weight of the subterranean rock.

5. The method of claim 1, wherein the subterranean rock comprises quartz comprising:
    elemental silicon, at a weight percentage of 85 to 90 wt. %;
    elemental sulfur, at a weight percentage of 0.01 to 0.05 wt. %;

elemental potassium, at a weight percentage of 1 to 5 wt. %;

elemental calcium, at a weight percentage of 1 to 5 wt. %;

elemental titanium, at a weight percentage of 0.1 to 1 wt. %;

elemental chromium, at a weight percentage of 0.1 to 1 wt. %;

elemental manganese, at a weight percentage of 0.1 to 1 wt. %;

elemental iron, at a weight percentage of 5 to 10 wt. %;

elemental zinc, at a weight percentage of 0.01 to 0.05 wt. %; and elemental zirconium, at a weight percentage of 0.1 to 0.5 wt. %, based on the total weight of the quartz.

6. The method of claim 1, wherein the subterranean rock comprises calcite comprising:

elemental silicon, at a weight percentage of 0.1 to 0.5 wt. %;

elemental sulfur, at a weight percentage of 0.1 to 0.5 wt. %;

elemental calcium, at a weight percentage of 95 to 99.5 wt. %;

elemental manganese, at a weight percentage of 0.01 to 0.05 wt. %;

elemental iron, at a weight percentage of 0.1 to 0.5 wt. %;

elemental zinc, at a weight percentage of 0.01 to 0.05 wt. %; and elemental zirconium, at a weight percentage of 0.01 to 0.05 wt. %, based on the total weight of the calcite.

7. The method of claim 1, wherein the subterranean rock is eagle ford shale comprising:

elemental silicon, at a weight percentage of 15 to 25 wt. %;

elemental sulfur, at a weight percentage of 1 to 5 wt. %;

elemental potassium, at a weight percentage of 0.1 to 0.5 wt. %;

elemental calcium, at a weight percentage of 70 to 80 wt. %;

elemental manganese, at a weight percentage of 0.1 to 1 wt. %;

elemental iron, at a weight percentage of 0.5 to 1 wt. %;

elemental aluminum, at a weight percentage of 1 to 5 wt. %; and elemental phosphorus, at a weight percentage of 0.1 to 0.5 wt. %, based on the total weight of the eagle ford shale.

8. The method of claim 1, wherein the subterranean rock comprises a plurality of particles having a particle size of 1 to 100 microns (μm), and the liquid activated carbon is absorbed at a volume percentage of 100 to 200 mL per 10 to 20 grams of the subterranean rock.

9. The method of claim 1, wherein the liquid activated carbon is absorbed in the underground geological formation at an ambient temperature for at least 24 hours.

10. The method of claim 1, wherein the gaseous mixture comprises hydrogen at a volume percentage of 95 to 100 vol. %.

11. The method of claim 1, wherein hydrogen is injected at a pressure of 0.5 to 10 MPa under an ambient temperature.

12. The method of claim 1, wherein 0.4 to 0.8 mmol of $H_2$ per 1 gram of the subterranean rock is adsorbed by the treated underground geological formation.

13. The method of claim 1, wherein 8 to 50% more $H_2$ by mole per 1 gram of the subterranean rock is absorbed by the treated underground geological formation than an untreated underground geological formation.

14. The method of claim 1, wherein hydrogen is injected at a pressure of 6 to 7 MPa, and the subterranean rock comprises quartz, and wherein 0.4 to 0.5 mmol of $H_2$ per 1 gram of the quartz is absorbed by the treated underground geological formation.

15. The method of claim 14, wherein 8 to 10% more $H_2$ by mole per 1 gram of the subterranean rock is absorbed by the treated underground geological formation than an untreated underground geological formation.

16. The method of claim 1, wherein hydrogen is injected at a pressure of 6 to 7 MPa, and the subterranean rock comprises calcite, and wherein 0.7 to 0.8 mmol of $H_2$ per 1 gram of the calcite is absorbed by the treated underground geological formation.

17. The method of claim 16, wherein 20 to 30% more $H_2$ by mole per 1 gram of the subterranean rock is absorbed by the treated underground geological formation than an untreated underground geological formation.

18. The method of claim 1, wherein the hydrogen is injected at a pressure of 6 to 7 MPa, and the subterranean rock is eagle ford shale, and wherein 0.6 to 0.7 mmol of $H_2$ per 1 gram of the eagle ford shale is absorbed by the treated underground geological formation.

19. The method of claim 18, wherein 40 to 50% more $H_2$ by mole per 1 gram of the subterranean rock is absorbed by the treated underground geological formation than an untreated underground geological formation.

* * * * *